B. E. BRUNSVOLD.
SPOUT ATTACHMENT.
APPLICATION FILED JUNE 30, 1917.
1,267,509.
Patented May 28, 1918.
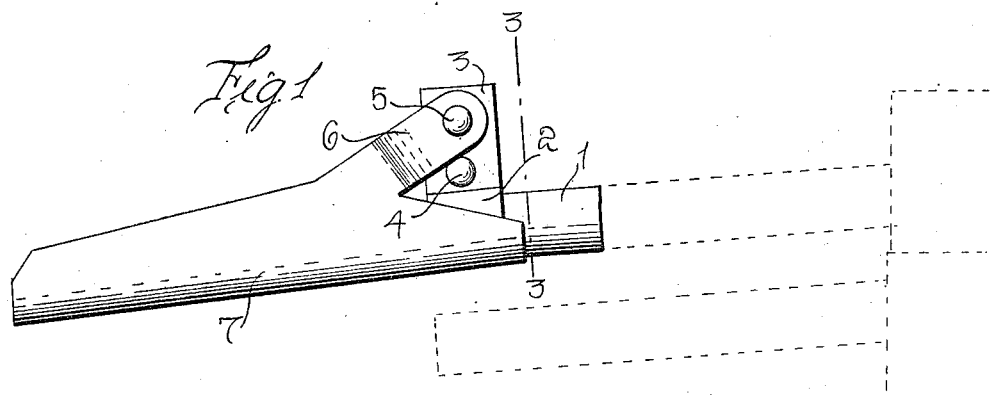
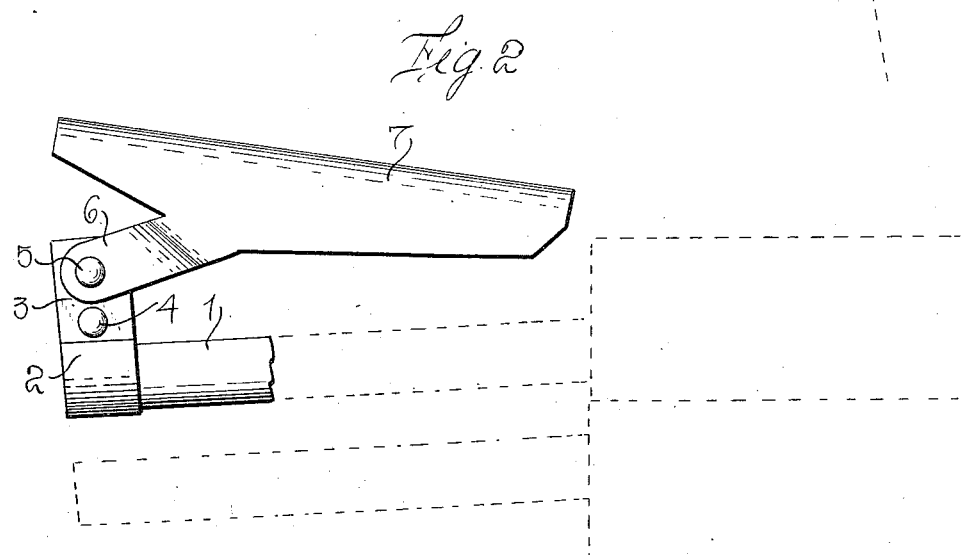
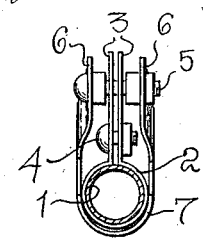
Inventor
B. E. BRUNSVOLD
By Watson E. Coleman
Attorney

UNITED STATES PATENT OFFICE.

BENDICK E. BRUNSVOLD, OF HATTON, NORTH DAKOTA.

SPOUT ATTACHMENT.

1,267,509.

Specification of Letters Patent.

Patented May 28, 1918.

Application filed June 30, 1917. Serial No. 177,907.

*To all whom it may concern:*

Be it known that I, BENDICK E. BRUNSVOLD, a citizen of the United States, residing at Hatton, in the county of Traill and State of North Dakota, have invented certain new and useful Improvements in Spout Attachments, of which the following is a specification, reference being had to the accompanying drawings.

This invention relates to certain improvements in spout attachments and it is an object of the invention to provide a novel and improved device of this general character which can be readily and conveniently applied to an operative position and which serves to afford an extension for the spout proper.

It is also an object of the invention to provide a novel and improved device of this general character which when in applied position is provided with a pivoted member serving as an extension for the spout and which pivoted member can be readily adjusted into or out of operative position.

The invention consists in the details of construction and in the combination and arrangement of the several parts of my improved spout attachment wherein certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings wherein—

Figure 1 is a view in elevation of a spout attachment constructed in accordance with an embodiment of my invention and shown applied to the milk spout or tube of a cream separator, a portion of the separator being indicated by dotted lines;

Fig. 2 is a view in elevation of my improved attachment showing the same in a second position, the co-acting portion of a cream separator being indicated in dotted lines with a portion of the milk spout or tube in elevation; and Fig. 3 is a sectional view taken substantially on the line 3—3 of Fig. 1.

As disclosed in the accompanying drawings 1 denotes the milk spout or tube of a cream separator and to which my improved attachment is applied. As herein embodied my improved attachment embodies a split collar 2 having its terminals 3 extending substantially radially therefrom and with which co-acts a clamping member 4 whereby the collar 2 may be effectively mounted upon the discharge end of the spout or tube 1.

The outer end portions of the terminals 2 have disposed therethrough the bolt 5 or the like with which are engaged the terminal portions of the arms 6 arranged in parallelism and extending on a predetermined incline from the free margins of the elongated and substantially straight member or chute 7. The arms 6 are connected with the member or chute 7 at a predetermined distance inwardly of the rear end portion thereof, and the free ends of said arms terminate inwardly of the rear end of the chute so that when the said member or chute 7 is swung downwardly the rear end portion thereof will underlie the free end portion of the spout or tube 1 so that said spout or tube 1 will discharge directly in the member or chute 7.

My improved attachment is especially adapted for use in connection with cream separators in view of the fact that the separator tank with which the spout or tube 1 communicates generally holds about two pails of milk. When the milk is first discharged through the spout or tube 1 the chute 7 is thrown upwardly into an inoperative position as illustrated in Fig. 2 of the drawings and the milk is discharged within a bucket suitably positioned therebelow. When this bucket is substantially filled it is only necessary to swing the chute or member 7 downwardly and the milk will be carried by said chute and caused to discharge within a second bucket. By this arrangement the operator can keep the separator at the same speed as it is not necessary to stop cranking to change buckets or pails.

From the foregoing description, it is thought to be obvious that a spout attachment constructed in accordance with my invention is particularly well adapted for use by reason of the convenience and facility with which it may be assembled and operated and it will also be obvious that my invention is susceptible of some change and modification without materially departing from the appearance and spirit thereof and for this reason I do not wish to be understood as limiting myself to the precise arrangement and formation of the several parts herein shown in carrying out my invention in practice except as hereinafter claimed.

I claim:

1. A spout attachment comprising a collar adapted to be engaged with a spout and provided with a substantially radially disposed upstanding extension, a substantially straight chute provided at opposite sides with transversely spaced arms pivotally engaged with the extension of the collar, said arms being positioned inwardly of the rear end of the chute and disposed on a predetermined incline toward said end.

2. A spout attachment comprising a collar adapted to be engaged with a spout and provided with a substantially radially disposed upstanding extension, a substantially straight chute provided at opposite sides with transversely spaced arms pivotally engaged with the extension of the collar, said arms being positioned inwardly of the rear end of the chute and disposed on a predetermined incline toward said end, and terminating inwardly thereof.

3. In combination with the milk spout of a cream separator provided with an upstanding extension adjacent the discharge end thereof, a substantially straight chute provided at its opposite sides with transversely spaced arms pivotally engaged with the extension of the spout, said arms being positioned inwardly of the rear end of the chute and disposed on a predetermined incline toward said end whereby the rear end portion of the chute may underlie the discharge end portion of the spout.

In testimony whereof I hereunto affix my signature in the presence of two witnesses.

BEN. E. BRUNSVOLD.

Witnesses:
E. G. BRUNSVOLD,
ABRAHAM HANSON.

Copies of this patent may be obtained for five cents each, by addressing the "Commissioner of Patents, Washington, D. C."